(12) United States Patent
Walker et al.

(10) Patent No.: US 12,417,665 B1
(45) Date of Patent: Sep. 16, 2025

(54) SYSTEM, METHOD, APPARATUS, AND COMPUTER PROGRAM PRODUCT FOR VOTER REGISTRATION AND VOTING

(71) Applicants: Earnest Milton Walker, Columbus, GA (US); Marckeith DeJesus, Atlanta, GA (US)

(72) Inventors: Earnest Milton Walker, Columbus, GA (US); Marckeith DeJesus, Atlanta, GA (US)

( * ) Notice: Subject to any disclaimer, the term of this patent is extended or adjusted under 35 U.S.C. 154(b) by 328 days.

(21) Appl. No.: 18/050,894

(22) Filed: Oct. 28, 2022

Related U.S. Application Data (60) Provisional application No. 63/263,184, filed on Oct. 28, 2021.

(51) Int. Cl.
*G07C 13/00* (2006.01)
*G06V 10/74* (2022.01)
*H04L 9/32* (2006.01)

(52) U.S. Cl.
CPC ............ *G07C 13/00* (2013.01); *G06V 10/761* (2022.01); *H04L 9/3231* (2013.01); *H04L 2209/463* (2013.01)

(58) Field of Classification Search
None
See application file for complete search history.

(56) References Cited

U.S. PATENT DOCUMENTS

| | | | |
|---|---|---|---|
| 7,032,821 B2 | 4/2006 | McClure | |
| 7,451,928 B2 | 11/2008 | Peterson | |
| 8,843,389 B2 | 9/2014 | Kaplan | |
| 9,576,194 B2 * | 2/2017 | Bowers | G06V 40/10 |
| 9,946,930 B2 * | 4/2018 | Matos | G06V 40/40 |
| 10,002,481 B2 | 6/2018 | Seibel | |
| 10,109,129 B2 | 10/2018 | Joyce | |
| 10,848,476 B2 | 11/2020 | Durham, III | |
| 10,944,643 B2 | 3/2021 | Weiner | |
| 11,531,737 B1 * | 12/2022 | Boyd | G06F 21/32 |
| 2003/0042298 A1 | 3/2003 | Allen | |
| 2008/0105742 A1 | 5/2008 | Kim | |

(Continued)

FOREIGN PATENT DOCUMENTS

WO  WO-2016131083 A1 *  8/2016

OTHER PUBLICATIONS

X. Fang, X. Fu and X. Xu, "ID card identification system based on image recognition," 2017 12th IEEE Conference on Industrial Electronics and Applications (ICIEA), Siem Reap, Cambodia, 2017, pp. 1488-1492, doi: 10.1109/ICIEA.2017.8283074. (Year: 2017).*

(Continued)

*Primary Examiner* — Eduardo Castilho
(74) *Attorney, Agent, or Firm* — Squire Patent Consulting; Brendan E. Squire (57) ABSTRACT

A system, method, apparatus, and computer program product voting and voter registration systems. A mobile and a web application will allow the voter to cast their ballot in any local, state, or federal election via the secured and encrypted cloud-based application and when applicable, register to vote. The apparatus for the voter registration will take place in the secured and encrypted cloud-based infrastructure application. The mobile and web application may require the voter to use additional tools to verify the voter's identification prior to receiving a ballot or registration request.

18 Claims, 3 Drawing Sheets

(56) References Cited

U.S. PATENT DOCUMENTS

| | | | | |
|---|---|---|---|---|
| 2013/0251214 | A1* | 9/2013 | Chung | G06Q 50/265 |
| | | | | 382/116 |
| 2014/0164074 | A1 | 6/2014 | Theo | |
| 2014/0224872 | A1* | 8/2014 | Griggs | G07C 13/00 |
| | | | | 235/380 |
| 2014/0351026 | A1 | 11/2014 | Merel | |
| 2015/0100392 | A1 | 4/2015 | Feig | |
| 2015/0221153 | A1* | 8/2015 | Dashiff | G07C 13/00 |
| | | | | 705/12 |
| 2015/0341370 | A1* | 11/2015 | Khan | H04L 63/20 |
| | | | | 726/30 |
| 2018/0096552 | A1 | 4/2018 | Davis | |
| 2018/0109507 | A1* | 4/2018 | Caldera | G06N 20/00 |
| 2018/0124047 | A1* | 5/2018 | Fisher | G06V 40/164 |
| 2020/0042773 | A1* | 2/2020 | Benkreira | G06V 20/62 |
| 2020/0258338 | A1 | 8/2020 | Goswami | |
| 2021/0051017 | A1* | 2/2021 | Durham, III | G06F 21/31 |
| 2022/0277066 | A1* | 9/2022 | Levine | G06V 40/16 |
| 2023/0050280 | A1* | 2/2023 | Duthoit | G06Q 20/3829 |

OTHER PUBLICATIONS

X. Wu, J. Xu, J. Wang, Y. Li, W. Li, and Y. Guo, "Identity authentication on mobile devices using face verification and ID image recognition," Procedia Computer Science, 2019, vol. 162, pp. 932-939. (Year: 2019).*

A. Castelblanco, J. Solano, C. Lopez, E. Rivera, L. Tengana, and M. Ochoa, "Machine Learning Techniques for Identity Document Verification in Uncontrolled Environments: A Case Study," in Pattern Recognition, 2020, pp. 271-281. (Year: 2020).*

D. Praveenbalaji, R. Srinivas, S. Roopa, M. Suresh and A. Gayathri, "ID Photo Verification by Face Recognition," 2020 6th International Conference on Advanced Computing and Communication Systems (ICACCS), Coimbatore, India, 2020, pp. 1449-1453, doi: 10.1109/ICACCS48705.2020.9074246. (Year: 2020).*

Google.com, "Vision AI," retrieved from https://web.archive.org/web/20210912111834/https://cloud.google.com/vision on Sep. 21, 2021 (Year: 2021).*

Kala et al., ""Secured and Transparent Voting System Using Biometric and Face Recognition,"" 2021 International Conference on Design Innovations for 3Cs Compute Communicate Control (ICDI3C), Bangalore, India, 2021, pp. 254-259, doi: 10.1109/ICDI3C53598.2021.00058 (Year: 2021).*

L. O'Gorman and I. Rabinovich, "Photo-image authentication by pattern recognition and cryptography," Proceedings of 13th International Conference on Pattern Recognition, Vienna, Austria, 1996, pp. 949-953 vol. 3, doi: 10.1109/ICPR.1996.547308. (Year: 1996).*

* cited by examiner

SYSTEM, METHOD, APPARATUS, AND COMPUTER PROGRAM PRODUCT FOR VOTER REGISTRATION AND VOTING

CROSS-REFERENCE TO RELATED APPLICATION

This application claims the benefit of priority of U.S. provisional application No. 63/263,184, filed Oct. 28, 2021, the contents of which are herein incorporated by reference.

BACKGROUND OF THE INVENTION

The present invention relates to voting systems, and more particularly to digital voting and voter registration systems.

Voting is a sacred fundamental right of all Americans, and all eligible voters should have the equal opportunity to exercise that right. The current voting process is antiquated and causes multiple issues in each state, ranging from faulty machines, missing power cords, system failures, and stalled touchscreens. These issues can cause polling locations to delay polling times, unexpected closures, limited polling staff and long lines.

While absentee ballots offer voters another option to cast their vote, there are multiple constraints that have been placed on this option such as state impose identification requirements, reduced time to request absentee ballots, restricting election officials from mailing out absentee ballot applications to all voters and severely reduced ballot drop boxes for the absentee ballots.

These traditional methods of voting are archaic, costly and time consuming. In some cases, voter confidence has decreased due to errors with voting machines and not receiving confirmation that their absentee ballot arrived on time and was counted towards an election. Only 53% of young people took part in the electoral process in 2020. Although this percentage increased from 2016 by 11%, imagine how many young voters between the ages of 18-30 would participate in the electoral process if there were an option to cast their ballot via mobile, web and cloud base application. We are living in the digital age, yet we are using pre-digital technology to cast a ballot.

As can be seen, there is a need for improved systems, methods, apparatus, and computer program products for voting and voter registration that will increase voter registration and voter participation in all elections by allowing all eligible voters to register to vote and once successfully registered, cast their vote using the secured and encrypted cloud base voting and registration application.

SUMMARY OF THE INVENTION

In one aspect of the present invention, a computer program product stored on a non-transitory computer storage medium comprising machine readable program code is disclosed. The machine-readable program coder causing, when executed, a computing device to perform process steps. The process steps include receiving one or more user entered identification data elements at a server hosting a voter registration system for registration of a user as a voter within a jurisdiction. An image of a photo identification (ID) card of the user is received at the server. The photo ID card has a barcode containing an encoding of one or more user identification data elements. The barcode is decoded at the server to extract one or more decoded user identification data elements encoded in the barcode. The one or more user entered identification elements are compare the with the one or more decoded user identification data elements. When there is a match between the one or more user entered identification elements with the one or more decoded user identification data elements a user is with the voter registration system.

In some embodiments, the image of the photo ID card is captured within a contained instance of a session between a computing device of the user and the server.

In some embodiments, a corresponding image from a governmental data repository is received at the server. The corresponding image is referenced by the one or more decoded user identification data elements. An artificial intelligence (AI) platform implementing a machine learning (ML) model that is trained to distinguish one or more facial recognition attributes of an image to identify a person, compares an image of a person from the photo ID and the corresponding image. When there is a matching of the corresponding image with the image of the person from the photo ID, the user is registered as a voter with the jurisdiction.

In some embodiments, a ballot containing one or more candidates for an elected office or a ballot initiative for an election cycle within the jurisdiction is received at the server.

In some embodiments, a contained instance image of the user that is captured within the session between the computing device of the user and the server is received at the server. The contained instance image of the user with the image of the person from the photo ID is compared by the AI platform. When there is a matching of the contained instance image with the image of the person from the photo ID, the user is verified as a voter.

In some embodiments, a tolerance threshold for the matching is specified. The tolerance threshold establishes a closeness of the matching between the contained instance image of the user and the image of the person from the photo ID. The contained instance image is matched with the image of the person from the photo ID according to the tolerance threshold.

In some embodiments, the ballot is transmitted to the computing device of the user when the user is verified as a voter.

In some embodiments, a voter selection of the one or more candidates or a voter choice on the ballot initiative for the ballot is received at the server.

In some embodiments, the server transmits a confirmation that the voter selection or the voter choice for the ballot has been received.

In other embodiments, the server transmits the voter selection or the voter choice for the ballot to the governmental data repository.

In yet other embodiments, the server receives a confirmation from the governmental data repository that the voter selection or the voter choice for the ballot has been tabulated.

In other aspects of the invention, a system for online voter registration and voting is disclosed. The system includes a server hosting the online voter registration and voting. The server is configured to communicate with one or more user computing devices and a data repository of a governmental entity. The system includes a program product comprising machine-readable program code for causing, when executed, the server to perform process steps. The process steps include receiving one or more user entered identification data elements at the server hosting a voter registration system for registration of a user as a voter within a jurisdiction. The server receives an image of a photo identification (ID) card of the user. The photo ID card has a barcode containing an encoding of one or more user identification data elements. The barcode is decoded to extract one or more decoded user identification data elements that are encoded in the barcode. The one or more user entered identification elements are compared with the one or more decoded user identification data elements. When there is a match between the one or more user entered identification elements and the one or more decoded user identification data elements, a user is registered with the voter registration system.

In some embodiments of the system, the image of the photo ID card is captured within a contained instance of a session between a computing device of the user and the server.

In some embodiments, a corresponding image from a governmental data repository is received at the server. The corresponding image is referenced by the one or more decoded user identification data elements. An artificial intelligence (AI) platform implementing a machine learning (ML) model trained to distinguish one or more facial recognition attributes of an image to identify a person compares an image of a person from the photo ID and the corresponding image. When there is a matching of the corresponding image with the image of the person from the photo ID the user is registered as a voter with the jurisdiction.

In some embodiments, a ballot containing one or more candidates for an elected office or a ballot initiative for an election cycle within the jurisdiction is received at the server.

In some embodiments, a contained instance image of the user captured within the session between the computing device of the user and the server is received at the server. The contained instance image of the user is compared with the image of the person from the photo ID by the AI platform. When there is a matching of the contained instance image with the image of the person from the photo ID, the user is verified as a voter.

In some embodiments, a tolerance threshold for the matching is specified. The tolerance threshold establishes a closeness of the matching between the contained instance image of the user and the image of the person from the photo ID. The contained instance image is then matched with the image of the person from the photo ID according to the tolerance threshold.

In some embodiments, the ballot to the computing device of the user when the user is verified as a voter.

In some embodiments, a voter selection of the one or more candidates or a voter choice on the ballot initiative for the ballot is received at the server.

In other embodiments, the voter selection or the voter choice for the ballot is transmitted to the governmental data repository.

In yet other embodiments, a confirmation from the governmental data repository that the voter selection or the voter choice for the ballot has been tabulated.

These and other features, aspects and advantages of the present invention will become better understood with reference to the following drawings, description and claims.

BRIEF DESCRIPTION OF THE DRAWINGS

FIG. 2b is a continuation of the system architecture shown in FIG. 2a.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, apparatus, and computer program product for providing a web, cloud, and mobile voting and voter registration application, hereinafter Vote Safe®. The Vote Safe® system 55s and methods may also provide an unregistered voter the opportunity to register to vote using one of the secured and encrypted applications which are connected to the user's local election office and or state elections office.

Figure 1:
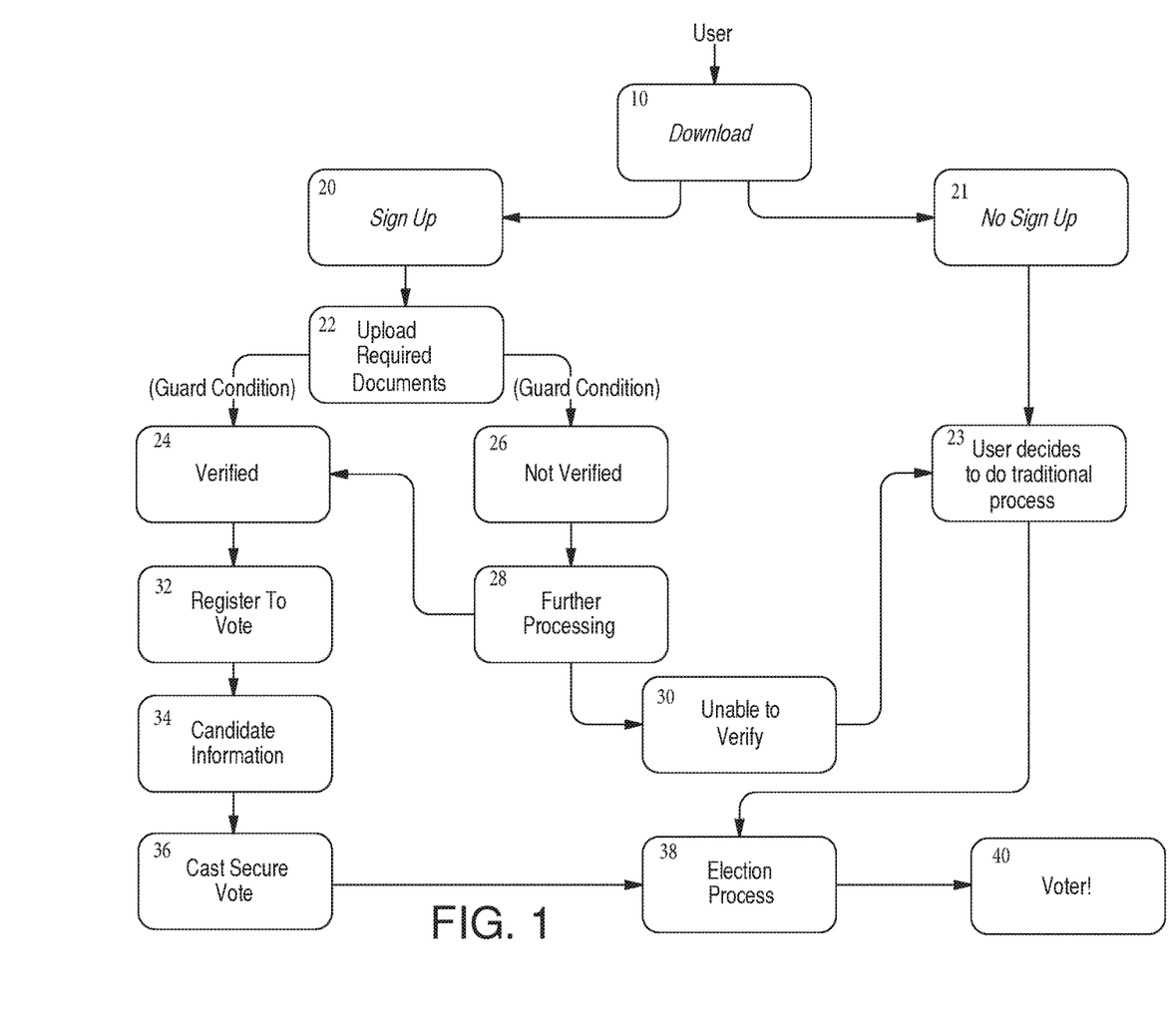
FIG. 1 is a flow chart illustrating a digital voter registration and voting process.

A representative process implementing the Vote Safe® mobile voting and voter registration system is shown in reference to FIG. 1. A voter registration and voting process may include the following steps:

At block 10, the user will first download a Vote Safe® app 58 using their mobile device or by using the internet to connect to the Vote Safe®, provided an end2end encryption. The Vote Safe® may be made available on a variety of computing devices 50 if the device meets specified hardware requirements. One or more versions of the Vote Safe® app 58 may be retained Utilizing the Vote Safe® app 58 the user may complete the steps of registering and voting in local, state, and federal elections without having to wait in line or worry about their ballot not being counted. Additionally, other systems could be integrated to use the verification technology to verify identities or to securely communicate with government agencies At block 20, utilizing encryption connection technologies with a cloud security layer 52, the user will be able to sign up and store their information in the Vote Safe® system 55 databases, which may be implemented in a cloud storage repository 64. The cloud storage repository 64 may be configured for a temporary storage of user data, with the data encrypted at rest. Once the app has been downloaded, the user has the option of whether to continue using the Vote Safe® app 58. If the user opts not to utilize the Vote Safe® app 58, at block 21, the user may proceed with utilizing traditional voting processes 23 available in their state or jurisdiction. To utilize the Vote Safe® system 55, at block 22, the user is required to create an account by entering a user credentials, such as a login and password. Account creation also involves the user to enter user identification data elements, which may include a name, a domicile, and optionally, one or more selected demographics, as required for a voter to register and/or vote within the jurisdiction. When logged into their account the user's interactions with the Vote Safe® system 55 are performed within a contained instance.

Once the user has established an account, at block 22, the system allows the user to upload one or more documents required by the jurisdiction to register to vote or to vote in an election within the jurisdiction. Typically, the one or more documents includes a photo identification card. By way of non-limiting example, the photo identification card (ID) may be a state issued driver's license, a state issued identification card, or a photo identification card issued by the federal government. Preferably, the one or more documents are imaged through the Vote Safe® app 58 by an imaging device, such as a camera or a scanner, which is coupled with the computing device 50 the user is utilizing to register and/or vote, so that the imaging and transfer of the one or more required documents is maintained within the contained instance. This also helps to ensure that the user is in physical possession of the identification card or document that is being utilized to register and/or vote. All personal information will be stored in the secure and encrypted cloud storage device 64. A cloud SQL 68 provides for additional processing of data exchanged between the Vote Safe® system 55 and the government database 70 to conform to one or more government standards, such as an encryption standard, preferably at least 256-bit encryption, for the exchange of data.

Once the user has entered all pertinent information and uploaded the required documents, the system performs an initial verification process to cross reference and verify the user's photo ID or to ensure that the user is eligible to register to vote. Preferably, the initial verification process is performed within the Vote Safe® system 55 infrastructure. However, some jurisdictions may require the verification to be performed in a state operated infrastructure.

The initial verification process may include a reading of a barcode, a QR code, or other machine-readable code (collectively referred to as a barcode herein) contained on the photo ID. One or more data elements embedded within the barcode may then be extracted and compared with the user credentials and demographic information to ensure their accuracy. The one or more data elements may also be extracted to compared with data maintained in a government database 70 to establish the user's eligibility to register to vote and vote within the jurisdiction.

The data maintained in the government database 70, identified by the extracted barcode data, should also include a corresponding photo for the image carried on the uploaded photo ID. In this case, the initial verification process may also include a comparison of the image carried on the photo ID with the corresponding image retained in the government database 70. Each of the image carried on the photo ID and the corresponding image retained in the government database 70 are provided to an artificial intelligence (AI) verification platform 60, described further below. When there is a match between the image carried on the photo ID and the corresponding image retained in the government database 70, the initial verification process is completed, and the user is registered to vote. When there is not a match between the image carried on the photo ID and the corresponding image retained in the government database 70, further processing at block 28 is required.

If the user is not verified at block 26 in the initial verification, further processing at block 28 may be required to verify the user before they are able to register. Likewise, in some jurisdictions, the identification and verification processes required to vote may be more stringent than those required to register to vote. In these instances, further processing at block 38 may be implemented in a supplemental verification process.

When required, the supplemental verification process may include a facial recognition of the user. Once the barcode data is verified, the supplemental verification process may include transferring the photo ID to the artificial intelligence (AI) verification platform 60 for the supplemental verification of the user. The AI verification platform 60 may be implemented utilizing a machine learning (ML) model that is trained utilizing an existing data repository, by new data, or using data provided by one or more governmental agencies. The ML model is trained to distinguish one or more facial recognition attributes of an image to identify a person. The ML model may further be trained to determine a matching of an identity of a person between one or more images of the person based on the one or more facial recognition attributes. The AI verification platform 60 is preferably housed within the Vote Safe® system 55.

If a comparison and matching of the photo ID with the user presenting the photo ID is required for voting by law within the jurisdiction, the supplemental verification process may also provide for a video or a photo verification of the user through the Vote Safe® system 55. In this case, the Vote Safe® app 58 is configured for the user to capture a contained instance image, which may be a photo or a video image of the user. The contained instance image is captured from within the Vote Safe® app 58 by an imaging device, such as a camera, connected with the user's computing device 50. The contained instance image is then sent to the AI verification platform 60 that performs a facial recognition matching to determine if the image from the photo ID corresponds with the contained instance image for supplemental verification that the user is the person shown on the photo ID card. Typically, this supplemental verification would occur within the Vote Safe® system 55 servers. As will be appreciated, the Vote Safe® system 55 may also be configured to securely pass the contained instance image and the photo ID image into the government data system 70 when the supplemental verification is required to occur there. Alternatively, or in addition to the photo ID image, the contained instance image of the user may also be compared with the corresponding image retained within the government data repository 70.

The AI verification system 60 may be configured with a tolerance threshold specifying the closeness of the facial recognition match between the contained instance image and the photo ID image. The tolerance threshold may be set by the governmental entities within the jurisdiction. If the closeness of the match meets the tolerance threshold verification requirements, then the system will generate a confirmation message between the government agency and the Vote Safe System.

When the user's identity is verified, the verification at block 24, the system will create a user account and confirm that the user has been registered to vote. A confirmation email may be sent to the user's email address they provided and a notification of upcoming elections in which the voter is eligible to vote may be provided for each election cycle. E-mail messages, confirmations, and acknowledgements are processed by a Cloud Pub/Sub element 62 within the cloud infrastructure 55. The confirmation email may also be transmitted to the user's local and or state election office confirming the user has successfully registered to vote. The user may then utilize the Vote Safe® app 58 to vote during the allowed voting periods for an election cycle, as established by the jurisdiction.

In some instances, such as where required by law in a particular jurisdiction, where the tolerance threshold is not met, where the tolerance threshold is marginally met, or as a randomly assigned auditing process, the further processing may also include an audiovisual interface session between the user and a designated election representative within the jurisdiction. When required, the Vote Safe® app 58 is configured with a control that allows the user to initiate the audiovisual interface session with the designated election representative within the user's contained instance. The audiovisual interface session allows the designated election representative to see and speak with the user and may ask questions confirming their identity, as they would with a voter appearing in person at a conventional physical polling location or voter registration location.

In some embodiments, the Vote Safe® processes at block 34, may be configured to provide the user information pertaining to the candidates or ballot initiatives for an upcoming election cycle to allow the user the opportunity to educate themself on the candidates or initiatives. With this option, the Vote Safe® app 58 may be configured to allow the user to access the Vote Safe® app 58 with only their login credentials. Alternatively, the Vote Safe® app 58 may be configured with a guest mode, to permit access to candidate information without logging in with user credentials.

In a preferred embodiment of the invention, the Vote Safe® system 55 allows the user the opportunity to vote, at block 36, via the app and have their vote tabulated with other voting systems within the jurisdiction as part of the election process 38. In this case, the Vote Safe® app 58 may be configured to prompt the user whether they would like vote during the particular Vote Safe® app 58 session. When the user indicates that they would like to vote during the particular session, the app is configured to run one or more of the initial validation and the supplemental validation processes to verify the identity of the user of the Vote Safe® app 58 as the voter during the voting session. The determination for running one or more of the initial validation process and the supplemental validation process may be specified by the jurisdiction in which the user is voting.

During a voting session, the Vote Safe® system 55 is configured to retrieve an electronic ballot from the government database 70 supplying an approved ballot for the current election cycle within the user's domicile. The Vote Safe® system 55 is configured to present the approved ballot to the user via the Vote Safe® app 58 and allow users to select their candidate of choice for each specific race or ballot initiative on the electronic ballot.

After selecting their candidate of choice for each race, the user is presented the opportunity to review their selected candidates for a confirmation of their selections. The Vote Safe® app 58 will then display the user's candidate selections and require the user to confirm their selections on the electronic ballot. The Vote Safe® app 58 is also configured to provide users with the opportunity to edit a selected candidate choice if they wish to make a change to a candidate previously selected.

Upon confirming their candidate selections, the Vote Safe® app 58 is configured to allow the user to cast their electronic ballot. The Vote Safe® system 55 is configured to generate an electronic acknowledgment that the user's electronic ballot has been successfully cast and is in the process of transmitting to their local and or state elections division for tabulation with the jurisdiction's election process, represented at block 38.

In some embodiments, the Vote Safe® system 55 may ask the user if they would like an electronic copy of their ballot choices emailed to them. If the user selects "Yes", the Vote Safe® system 55 may request the user to enter their email address and confirm the email address is correct with the user's login credentials. Once confirmed, the system will email the user a copy of their submitted/cast ballot.

After the user casts their ballot using the secure electronic ballot, the Vote Safe® system 55 transmits the cast ballot to the government data repository 70 hosted by the jurisdiction for execution and tabulation with its election processes 38. A confirmation email from the user's local election division or secretary of state elections division will be emailed to the user confirming receipt of the cast ballot. Likewise, the interface between the government data repository 70 and the Vote Safe® system 55 may provide for receipt of a confirmation that ballot has been tabulated as part of the election processes 38 with the user receiving a confirmation that they are a voter, as represented at block 40.

Embodiments of the invention may further provide a method that allows the voter to view, via real time, the results of the election via mobile, web, and cloud base application. The model will provide updated election results directly from the user's local or state elections division while the user is logged into the secure and encrypted cloud base application.

Figure 2A:
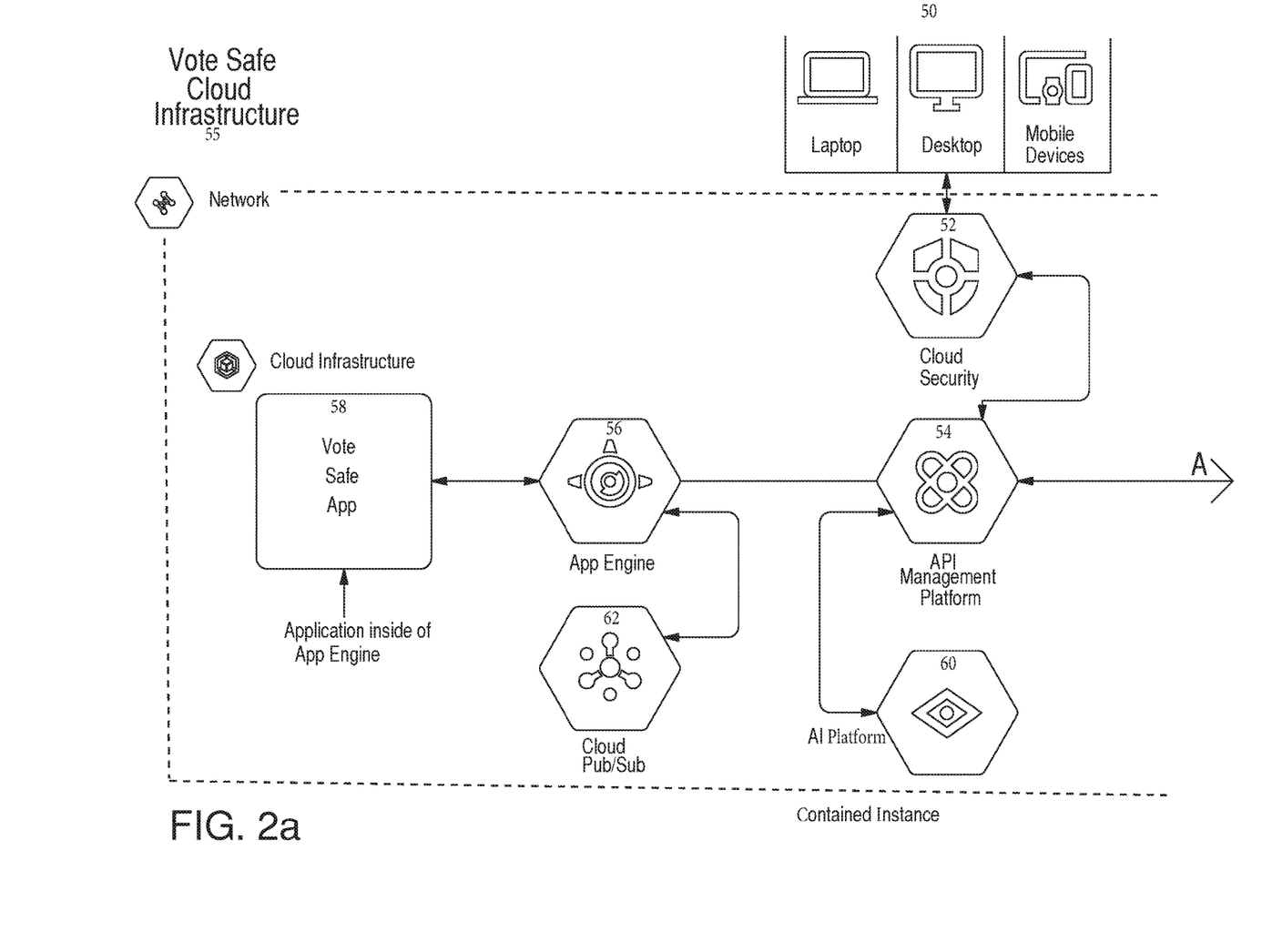
FIG. 2a is a diagram illustrating a representative system architecture for hosting the digital voter registration and voting system on a cloud-based server.
Figure 2B:
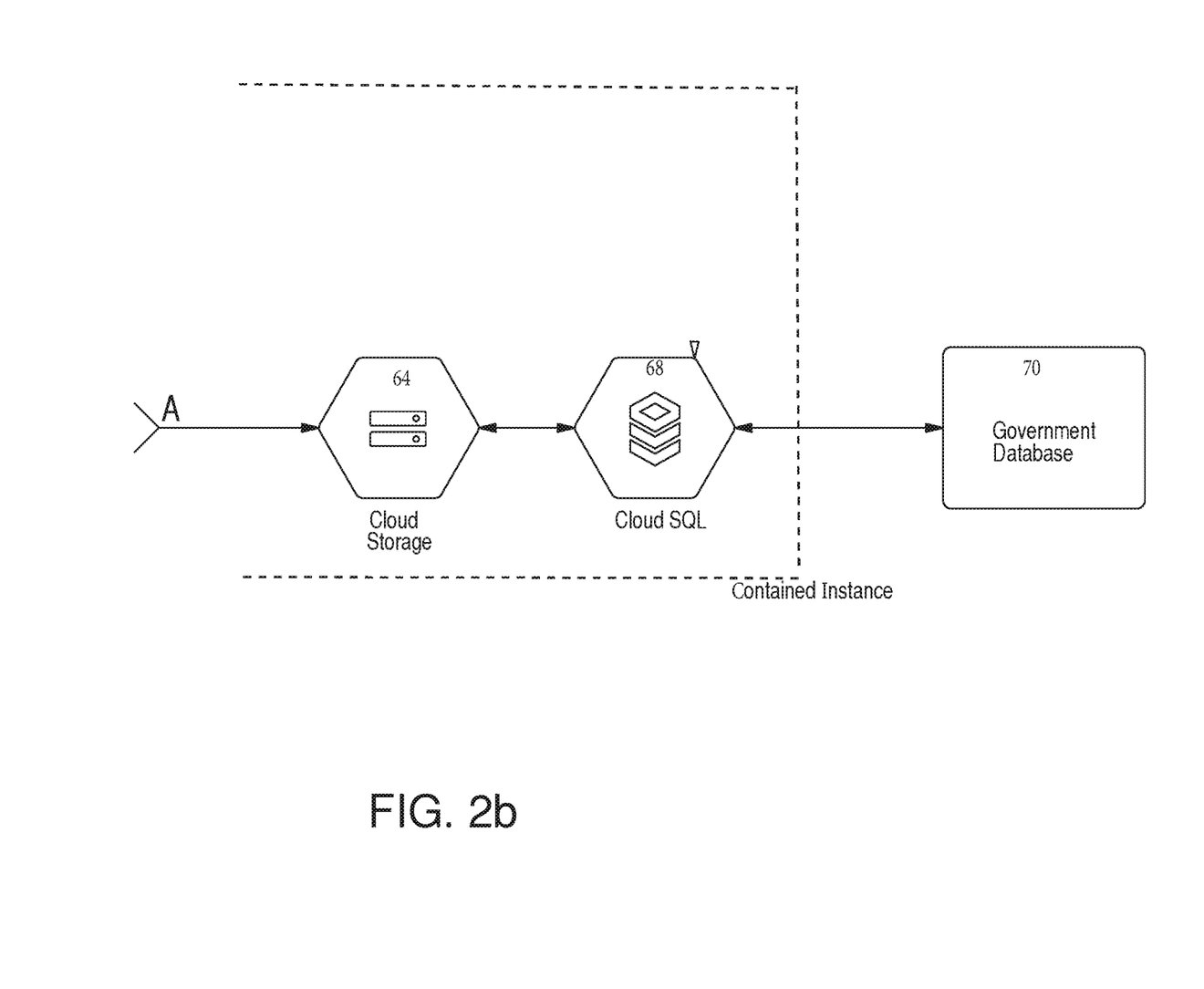

A representative system architecture of the Vote Safe® system 55 is shown in reference to FIGS. 2a and 2b. As indicated previously, the user may access the Vote Safe® system 55 via a computing device 50, such as a laptop, a desktop, or a mobile computing device. A network architecture for the Vote Safe® system 55 provides a contained instance of the user's interactions with the system and government jurisdictions participating with the Vote Safe® system 55.

The Vote Safe® system 55 is hosted in a cloud-based networking environment. User access to the system is controlled and secured via a cloud security element 52. The Vote Safe® app 58 and the cloud security element 52 provide for encryption and security of information passing between the Vote Safe® system 55 and the Vote Safe® app 58. Preferably, the information includes an encryption of the data while at rest on the Vote Safe® app 58 and within the Vote Safe® system 55. Likewise, the information is preferably encrypted while in transit between the Vote Safe® system 55, the Vote Safe® app 58, and one or more government data systems70 interacting with the Vote Safe® system 55.

An application programming interface 52 within the Vote Safe® system 55 architecture controls information flows within the Vote safe system and between the Vote Safe® system 55, the Vote Safe® app 58, and the one or more government data systems 70. A Vote Safe® app 58 engine 56 controls the voting and voter registration processes executed by and between the Vote Safe® app 58 and the cloud-based servers. Preferably, the ML and AI system 60, operations of which are previously described, is contained within the Vote Safe® architecture.

The Vote Safe® system 55 of the present invention may include at least one computer 50 with a user interface. The computer 50 may include any computer including, but not limited to, a desktop, laptop, and smart device, such as, a tablet and smart phone. The computer 50 includes a program product including a machine-readable program code for causing, when executed, the computer 50 to perform steps. The program product may include software 58 which may either be loaded onto the computer or accessed by the computer. The loaded software 58 may include an application on a smart device 50. The software 58 may be accessed by the computer using a web browser. The computer 50 may access the software via the web browser using the internet, extranet, intranet, host server, internet cloud and the like.

The computer-based data processing system and method described above is for purposes of example only and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that aspects of the present invention may be run on a stand-alone computer system 50, or may be run from a server computer system, including a cloud based server, that can be accessed by a plurality of client computer systems 50 interconnected over a communications network, or that is accessible to clients over the Internet.

In addition, many embodiments or aspects of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computer program product stored on a non-transitory computer storage medium comprising machine readable program code for causing, when executed, a computing device to perform process steps, comprising:
   receiving one or more user entered identification data elements at a server hosting a voter registration system for registration of a user as a voter within a jurisdiction;
   receiving, at the server, an image of a photo identification (ID) card of the user, the photo ID card having a barcode containing an encoding of one or more user identification data elements, the image of the photo ID card captured within a contained instance of a session between a computing device of the user and the server;
   decoding the barcode, at the server, to extract one or more decoded user identification data elements encoded in the barcode;
   comparing the one or more user entered identification elements with the one or more decoded user identification data elements;
   receiving, at the server, a corresponding image from a governmental data repository, the corresponding image referenced by the one or more decoded user identification data elements;
   comparing, via an artificial intelligence (AI) platform implementing a machine learning (ML) model trained to distinguish one or more facial recognition attributes of an image to identify a person according to a tolerance threshold, an image of a person from the photo ID to the corresponding image;
   registering the user with the voter registration system in an initial verification of the user in response to a match between the one or more user entered identification elements with the one or more decoded user identification data elements; and
   registering the user as a voter with the jurisdiction in a supplemental verification in response to matching of the corresponding image with the image of the person from the photo ID according to the tolerance threshold.

2. The computer program product of claim 1, further comprising:
   receiving, at the server, a ballot containing one or more candidates for an elected office or a ballot initiative for an election cycle within the jurisdiction.

3. The computer program product of claim 2, further comprising:
   receiving, at the server, a contained instance image of the user captured within the session between the computing device of the user and the server;
   comparing the contained instance image of the user with the image of the person from the photo ID by the AI platform; and
   when there is a matching of the contained instance image with the image of the person from the photo ID, verifying the user as a voter.

4. The computer program product of claim 3,
   wherein the tolerance threshold establishes a closeness of the matching between the contained instance image of the user and the image of the person from the photo ID.

5. The computer program product of claim 3, further comprising:
   transmitting the ballot to the computing device of the user when the user is verified as a voter.

6. The computer program product of claim 5, further comprising:
   receiving, at the server, a voter selection of the one or more candidates or a voter choice on the ballot initiative for the ballot.

7. The computer program product of claim 6, further comprising:
   transmitting, from the server, a confirmation that the voter selection or the voter choice for the ballot has been received.

8. The computer program product of claim 6, further comprising:
   transmitting, by the server, the voter selection or the voter choice for the ballot to the governmental data repository.

9. The computer program product of claim 8, further comprising:
   receiving, at the server, a confirmation from the governmental data repository that the voter selection or the voter choice for the ballot has been tabulated.

10. A system for online voter registration and a voting, comprising:
    a server hosting the online voter registration and voting, the server configured to communicate with one or more user computing devices and a data repository of a governmental entity;
    a program product comprising machine-readable program code for causing, when executed, the server to perform process steps, comprising:
       receiving one or more user entered identification data elements at the server hosting the online voter registration and voting system for registration of a user as a voter within a jurisdiction;
       receiving an image of a photo identification (ID) card of the user, the photo ID card having a barcode containing an encoding of one or more user identification data elements;
       decoding the barcode to extract one or more decoded user identification data elements encoded in the barcode;
       comparing the one or more user entered identification elements with the one or more decoded user identification data elements;

receiving a corresponding image from a governmental data repository, the corresponding image referenced by the one or more decoded user identification data elements;

comparing, via an artificial intelligence (AI) platform implementing a machine learning (ML) model trained to distinguish one or more facial recognition attributes of an image to identify a person according to a tolerance threshold, an image of a person from the photo ID to the corresponding image;

registering the user with the voter registration system in an initial verification of the user in response to a match between the one or more user entered identification elements with the one or more decoded user identification data elements; and registering the user as a voter with the jurisdiction in a supplemental verification in response to matching of the corresponding image with the image of the person from the photo ID according to the tolerance threshold.

11. The system of claim 10, wherein the image of the photo ID card is captured within a contained instance of a session between a computing device of the user and the server.

12. The system of claim 11, further comprising:
receiving, at the server, a ballot containing one or more candidates for an elected office or a ballot initiative for an election cycle within the jurisdiction.

13. The system of claim 12, further comprising:
receiving, at the server, a contained instance image of the user captured within the session between the computing device of the user and the server;

comparing the contained instance image of the user with the image of the person from the photo ID by the AI platform; and when there is a matching of the contained instance image with the image of the person from the photo ID, verifying the user as a voter.

14. The system of claim 13, wherein the tolerance threshold establishes a closeness of the matching between the contained instance image of the user and the image of the person from the photo ID.

15. The system of claim 13, further comprising:
transmitting the ballot to the computing device of the user when the user is verified as a voter.

16. The system of claim 15, further comprising:
receiving a voter selection of the one or more candidates or a voter choice on the ballot initiative for the ballot.

17. The system of claim 16, further comprising:
transmitting the voter selection or the voter choice for the ballot initiative to the governmental data repository.

18. The system of claim 17, further comprising:
receiving a confirmation from the governmental data repository that the voter selection or the voter choice for the ballot has been tabulated.

* * * * *